US006195430B1

(12) United States Patent
Eriksson et al.

(10) Patent No.: US 6,195,430 B1
(45) Date of Patent: Feb. 27, 2001

(54) METHOD AND DEVICE FOR ECHO CANCELLATION USING POWER ESTIMATION IN A RESIDUAL SIGNAL

(75) Inventors: Anders Eriksson, Uppsala; Johnny Karlsen, Sundbyberg, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/098,506

(22) Filed: Jun. 17, 1998

Related U.S. Application Data

(63) Continuation of application No. PCT/SE96/01610, filed on Dec. 6, 1996.

(30) Foreign Application Priority Data

Dec. 18, 1995 (SE) ...................................... 9504520

(51) Int. Cl.[7] .................................................. H04M 9/08
(52) U.S. Cl. ........................................... 379/410; 379/406
(58) Field of Search .................................. 379/406, 410, 379/407, 408, 409, 411

(56) References Cited

U.S. PATENT DOCUMENTS

| 4,577,071 | 3/1986 | Johnston et al. ...................... 379/410 |
| 4,736,414 | * 4/1988 | Montagna et al. .................... 379/411 |
| 4,879,745 | * 11/1989 | Arbel ..................................... 379/389 |
| 4,894,820 | * 1/1990 | Miyamoto et al. .................. 370/32.1 |
| 5,157,653 | 10/1992 | Genter .................................. 370/32.1 |
| 5,274,705 | * 12/1993 | Younce et al. ........................ 379/410 |
| 5,327,495 | * 7/1994 | Shenoi et al. ......................... 379/410 |
| 5,390,250 | * 2/1995 | Janse et al. ............................ 379/410 |

FOREIGN PATENT DOCUMENTS

| 0 604 948 | 7/1994 | (EP) ................................. H04B/3/23 |
| 95/19085 | 7/1995 | (WO) ............................. H04M/9/08 |

OTHER PUBLICATIONS

Slock, Dirk, "On the Convergence Behavior of the LMS and the Normalized LMS Algorithms", Jour. of Lightwave Technology, IEEE, v41, n9, p2811–2845, Sep. 1993.

Ljung, Lennart et al., "Theory and Practice of Recursive Indentification", MIT Press, p 12–16, 88–96, 1983.

* cited by examiner

Primary Examiner—Richemond Dorvil
(74) Attorney, Agent, or Firm—Burns, Doane, Swecker & Mathis, L.L.P.

(57) ABSTRACT

An echo canceller determines a dynamic threshold that depends on a non-linear error power estimate and also a linear error power estimate. A residual power estimate of a residual signal is compared to this dynamic threshold. The residual signal is attenuated in a non-linear processor if the residual estimate falls below the dynamic threshold.

9 Claims, 5 Drawing Sheets

METHOD AND DEVICE FOR ECHO CANCELLATION USING POWER ESTIMATION IN A RESIDUAL SIGNAL

This application is a continuation of International Application No. PCT/SE96/01610, filed Dec. 6, 1996, which designated the United States, and which is expressly incorporated here by reference.

The present invention relates to an echo canceller and an echo cancellation method using a model of an echo path for forming a residual signal.

BACKGROUND OF THE INVENTION

Echo is a problem related to the perceived speech quality in telephony systems with long delays, e.g. telephony over long distances or telephony systems using long processing delays, like digital cellular systems. The echo arises in the four-to-two wire conversion in the PSTN/subscriber interface. To remove this echo, echo cancellers are usually provided in transit exchanges for long distance traffic, and in mobile services switching centers for cellular applications.

Due to the location of the echo canceller it is made adaptive; the same echo canceller is used for many different subscribers in the PSTN. This adaption is necessary not only between different calls, but also during each call, due to the non-fixed nature of the transmission network, e.g., phase slips, three-party calls, etc.

The main part of an echo canceller is an adaptive filter. The filter generates a replica of the echo, which is subtracted from the near end signal. Due to imperfect knowledge of the echo generating system, the estimated echo signal always contains errors. Hence, in practice, the echo attenuation obtained by using an adaptive filter is usually at most approximately 30 dB. For long time delays this attenuation is not enough, and in order to minimize the audible effects of these errors, a residual echo suppressor is used. The purpose of the echo suppressor is to further suppress the residual signal whenever this signal is dominated by the errors in the echo estimate. This is done by blocking the output of the echo canceller for certain levels of the output signal.

U.S. Pat. No. 4,557,072 describes an echo canceller provided with an echo suppressor in the form of an adaptive center clipper. The echo estimate produced by the echo canceller is used to control, via signal processing means, the threshold, and thereby the clipping window, of this adaptive clipper. If the power of the residual signal falls below the adaptive threshold, the residual signal is blocked or clipped, otherwise the residual signal is passed through the adaptive clipper without modification. However, the residual signal contains not only residual echo, but also background noise produced at the near end subscriber. Occasionally residual echo samples and background noise samples add constructively, and the resulting residual signal may therefore exceed the threshold. The result is undesirable sporadic transmissions of residual signals containing residual echo, which can be very annoying.

A basic problem with echo cancelling is that an echo canceller operates in a wide range of system and signal conditions:

(i) The system may have an attenuation of, say, 6–25 dB, and may be well described by a linear model.
(ii) The background noise level at the near end may be between, say, −65—−30 dBm0.
(iii) The system may have a poor attenuation and may be poorly modelled as a linear system.

Determining proper values of thresholds that give satisfactory performance of echo suppressors in all relevant situations is a fundamental problem with control strategies based on power comparisons. Designing the threshold for case (i) would lead to imperfect suppression of the residual echo for systems described by case (iii). However, designing for case (iii) would lead to a very conservative suppressing function for systems described by case (i). Furthermore, the amount of background noise from the near end side (case (ii)) affects the performance of the adaptive filter in the echo canceller. For a high background noise level, the fluctuation of the estimated model, and not the model errors, might dominate the residual signal. Hence, even for systems described by case (i), different control strategies for the echo suppressor should be taken depending on the background noise level. From this discussion it is clear that it is difficult, if not impossible, to obtain one fixed control strategy and one set of fixed parameters that give a satisfactory performance of the echo suppressor in all relevant situations.

SUMMARY OF THE INVENTION

An object of the present invention is to provide a new echo canceller and a new echo cancellation method that adapt relevant parameters to different situations in order to avoid the above problems.

The basic idea of the present invention is to use dynamic power estimates non-linear errors, and preferably also linear errors, in the residual signal to determine a dynamic threshold, and to attenuate the residual signal if the power of the residual signal falls below this dynamic threshold.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description elements performing the same or similar functions have been provided with the same reference designations.

Figure 1:
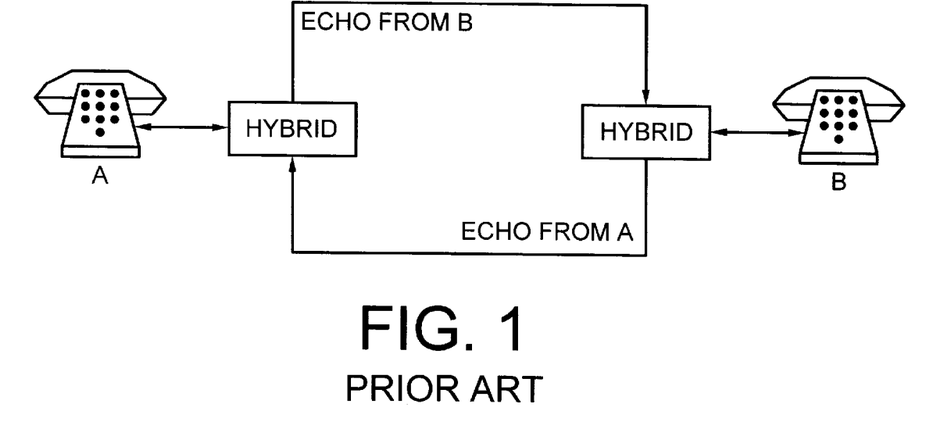
FIG. 1 is a block diagram of an echo generating system.

FIG. 1 illustrates the echo generating process in a telephony system. A subscriber A, called the far end subscriber below, is connected to a hybrid (a hybrid forms the interface between a four-wire and a two-wire connection, as is well known in the art) over a two-wire line. Similarly a subscriber B, called the near end subscriber below, is connected to another hybrid over a two-wire line. The two-wire lines transfer both incoming and outgoing speech signals. Outgoing speech from far end subscriber A is transferred to near end subscriber B over the upper two-wire line in FIG. 1. Similarly outgoing speech from near end subscriber B is transferred to far end subscriber A on the lower two-wire line in FIG. 1. However, the lower two-wire line from subscriber B to subscriber A also contains an echo of outgoing speech from subscriber A, which the hybrid at subscriber B was not able to suppress completely. Similarly the upper two-wire line in FIG. 1 contains echo from outgoing speech from subscriber B.

Figure 2:
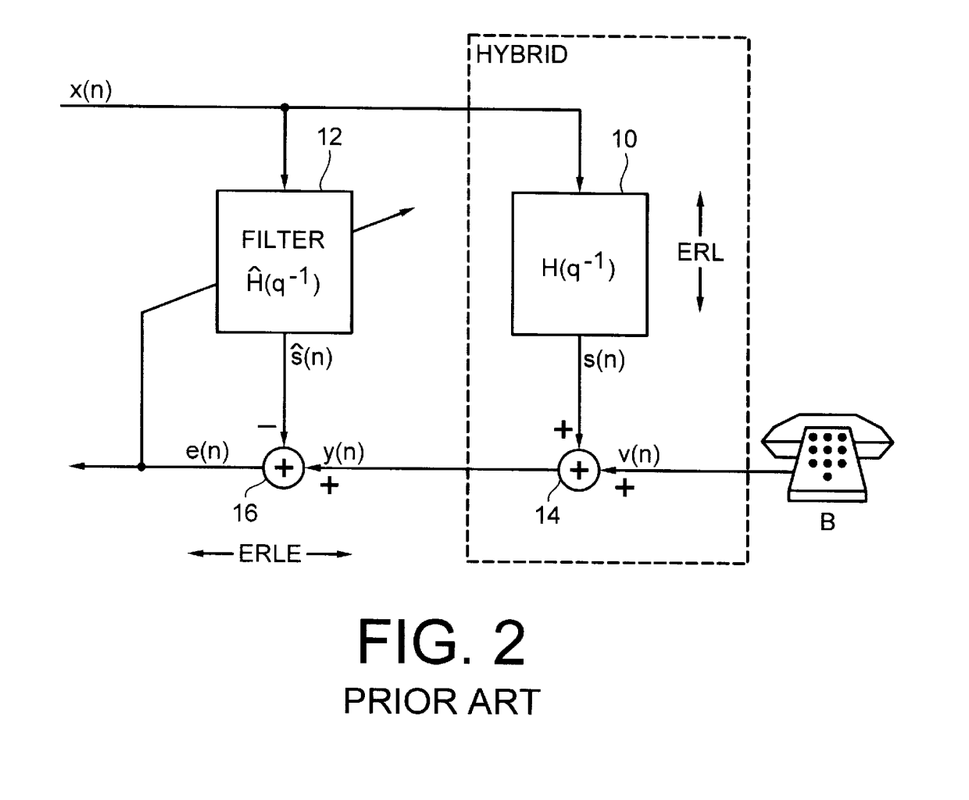
FIG. 2 is a block diagram of an echo cancellation system.

FIG. 2 illustrates how the echo back to subscriber A is cancelled at the near end side (a similar arrangement is provided at the far end side). Input signal x(n), where n denotes discrete time, represents speech from subscriber A. The input signal x(n) is attenuated by the hybrid, represented by a filter 10 with transfer function $H(q^{-1})$, where $q^{-1}$ represents the backward shift operator ($q^{-1}x(n)=x(n-1)$), and a summation unit 14, and the resulting echo signal s(n) is combined with the near end signal v(n), which may or may not contain near end speech, in summation unit 14. The attenuation of filter 10 is represented by the echo path attenuation ERL (ERL=Echo Return Loss). Thus, the resulting output signal y(n) contains both the near end signal and echo from the far end signal. Furthermore, input signal x(n) is also forwarded to an adaptive filter 12, which models the impulse response of the hybrid by adjusting its filter coefficients. The resulting estimate of echo signal s(n) is denoted ŝ(n). This estimate is, in a summation unit 16, subtracted from output signal y(n) (ERLE=Echo Return Loss Enhancement represents the obtained improvement in echo attenuation), and the resulting error signal e(n) is forwarded to adaptive filter 12 for adjustment of the filter coefficients and to the two-wire line back to far end subscriber A. The coefficients of filter 12 may be adjusted in accordance with, for example, the NLMS algorithm see D. T. M. Slock, "On the Convergence Behavior of the LMS and the Normalized LMS Algorithm", IEEE Transaction on Signal Processing, 41(9), pp. 2811–2855, September 1993.

Figure 3:
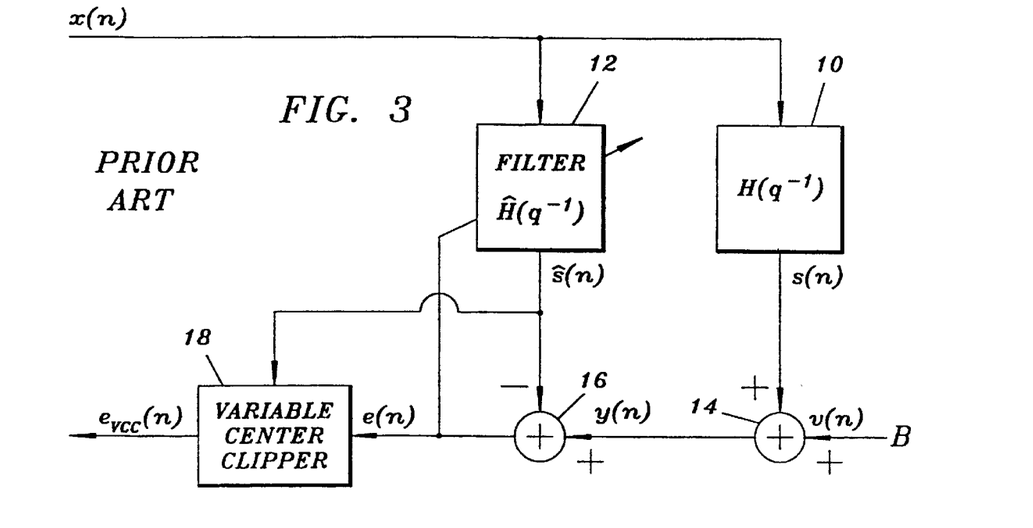
FIG. 3 is a block diagram of a previously known echo canceller with a variable center clipper.
Figure 4:
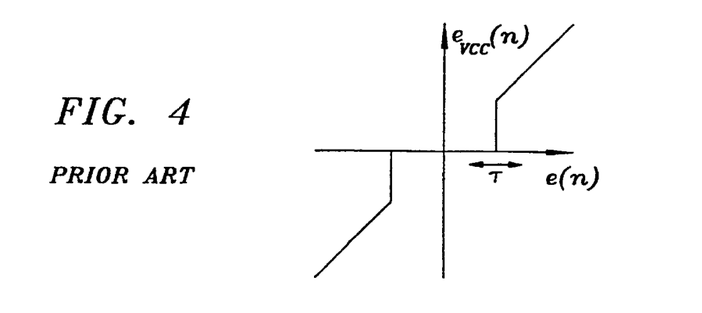
FIG. 4 is a diagram illustrating the transfer function of the center clipper of the echo canceller of FIG. 3.

Since adaptive filter 12 may not completely remove the echo, the echo canceller may be supplemented by an echo suppressor. FIG. 3 illustrates an arrangement of this type described in U.S. Pat. No. 4,577,071. Here the echo suppressor has the form of a variable center clipper 18, which is controlled by the estimated echo signal ŝ(n). The output signal $e_{vcc}(n)$ from center clipper 18 may be described by $$e_{vcc}(n) = \begin{cases} 0: & |e(n)| < \tau = \delta \cdot |\hat{s}(n)| \\ e(n): & |e(n)| \geq \tau \end{cases} \quad (1)$$

where τ is the variable threshold of center clipper 17 and δ is a constant scaling factor. This transfer function is illustrated in FIG. 4. Thus, if signal e(n) falls within the center window it will be completely blocked, otherwise it will pass through center clipper 18 unaltered. However, threshold τ depends on the value of ŝ(n). Thus, if ŝ(n) has a low magnitude, threshold τ will also be low. In this case |e(n)| may actually exceed the threshold if signal e(n) contains significant background noise from subscriber B. Thus, signal $e_{vcc}(n)$ may contain sporadic signals containing echo and background noise. In this previously known arrangement there is no way to avoid this situation, since scaling factor δ is a constant.

The present invention will now be described with reference to FIGS. 5–11.

Briefly, the present invention differs from the prior art in three aspects, namely the non-linear processing of the residual signal e(n), the determination of a dynamic threshold that may depend on both linear and non-linear errors, and the determination of dynamic scaling factors in this threshold.

Non-linear processing

Instead of comparing residual signal e(n) directly to a threshold a power estimate $R_e(n)$ over a predetermined time period is formed, for example in accordance with $$R_e(n) = \rho R_e(n-1) + (1-\rho)e^2(n) \quad (2)$$

where weighting factor ρ is a constant between 0 and 1, for example 127/128. Furthermore, the power may also be estimated by summing the squares of, for example, the last 128 samples of e(n), but equation (2) requires a less complex implementation.

The non-linear processing is divided into two steps. In the first step the shape of a transfer function is defined in accordance with $$e_c(n) = \begin{cases} \text{sgn}(e(n)) \cdot \min(|e(n)|, NL): & R_e(n) < TH(n) \\ e(n): & R_e(n) \geq TH(n) \end{cases} \quad (3)$$

where TH(n) is a dynamic threshold (defined below) and NL is a measure of the background noise level from near end subscriber B. The background noise level NL may, for example, be estimated as the minimum value of the residual power $R_e$ over a long time interval.

In the second step an attenuation A(n) is determined in accordance with $$A(n) = \begin{cases} \max(A(n-1)+1, 32): & R_e(n) < TH(n) \\ \min(A(n-1)-1, 0): & R_e(n) \geq TH(n) \end{cases} \quad (4)$$

Here the attenuation is divided into 32 levels, but this is only an example. Both fewer and more levels are possible.

Finally, compensated signal $e_c(n)$ of (3) is attenuated in accordance with $$e_{NLP}(n) = \frac{32 - A(n)}{32} e_c(n) \tag{5}$$

FIGS. 5–8 illustrate this procedure for different attenuations. FIGS. 5a–8a illustrate the transfer function defined by the linear processing in accordance with the present invention for the case $R_e(n) < TH(n)$. Similarly FIGS. 5b–8b illustrate the transfer function for the case $R_e(n) \geq TH(n)$. As can be seen from these figures the shape of the transfer function depends on whether power estimate $R_e(n)$ exceeds or falls below threshold $TH(n)$. If the power estimate exceeds the threshold, the transfer function will simply be a linear function, represented by the straight lines in FIGS. 5b–8b. On the other hand, if power estimate $R_e(n)$ falls below threshold $TH(n)$, the transfer function will be non-linear, with a linear part for amplitudes of $e(n)$ below the noise level NL, and a constant part for values above the noise level NL. As can be seen from FIGS. 5–8 the left hand figures are similar in shape, but have different attenuations. The same comment applies to the right hand figures. The reason for this is that in equation (4) the attenuation $A(n)$ depends on the attenuation $A(n-1)$ of the previous sample.

Figure 6:
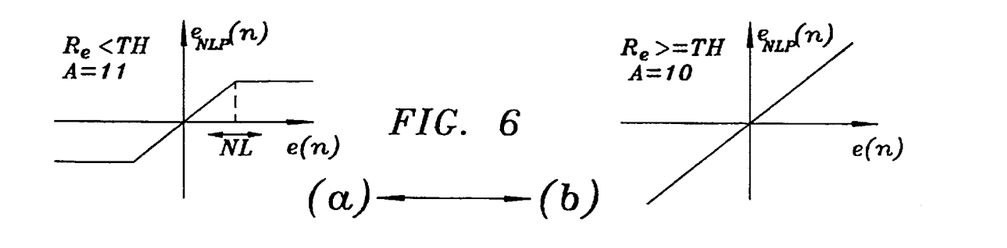
FIGS. 6a–6b are diagrams illustrating the different transfer functions of a non-linear processor in accordance with the present invention for two different cases at low attenuation.
Figure 7:
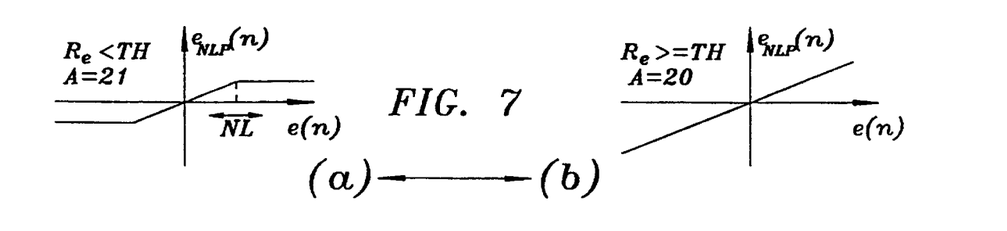
FIGS. 7a–7b are diagrams illustrating the different transfer functions of a non-linear processor in accordance with the present invention for two different cases at high attenuation.
Figure 8:
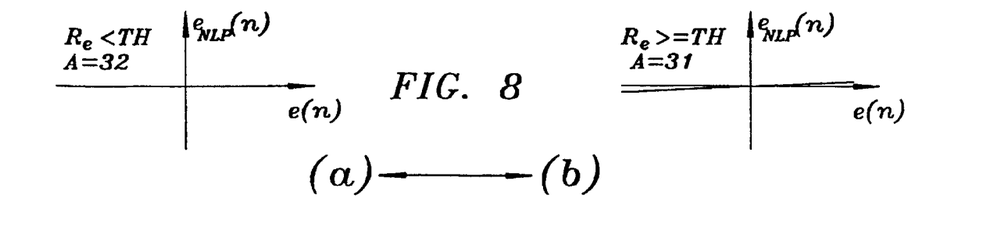
FIGS. 8a–8b are diagrams illustrating the different transfer functions of a non-linear processor in accordance with the present invention for two different cases at highest possible attenuation.

As may be seen from FIGS. 5a–8a, as long as $R_e(n) < TH(n)$ the attenuation $A(n)$ will increase, until signal $e(n)$ will be completely suppressed when the attenuation $A(n)$ has reached its maximum value (FIG. 8a). An essential difference, as compared to FIG. 4, is that at this maximum attenuation all values of $e(n)$ will be blocked, not only values that fall within a center clipping window. Thus, in this case signals containing both residual echo and background noise will be suppressed even when these signals add constructively.

On the other hand, as may be seen from FIGS. 5b–8b, when $R_e(n)$ exceeds $TH(n)$ output signal $e_{MLP}(n)$ will be a linearly scaled version of signal $e(n)$. If the above condition persists until the attenuation $A(n)$ has reached zero level, signal $e(n)$ will be unaltered.

Figure 5:
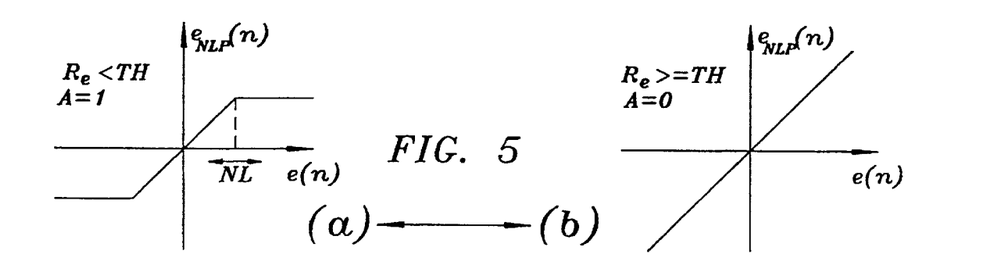
FIGS. 5a–5b are diagrams illustrating the different transfer functions of a non-linear processor in accordance with the present invention for two different cases at lowest possible attenuation.

Thus, in the two stationary cases (with either maximum or minimum attenuation $A(n)$), signal $e(n)$ will either by completely suppressed (FIG. 8a) or unaltered (FIG. 5b). FIGS. 6 and 7 represent the transitional phase between these two stationary states. The double arrows in FIGS. 5–8 illustrate the fact that the transfer function may change shape is power estimate $R_e(n)$ falls below threshold $TH(n)$ for one sample and $R_n(n+1)$ exceeds threshold $TH(n+1)$ for the next sample, or vice versa. Thus, depending on the result of this test condition, the shape of the transfer function may change abruptly, but the attenuation $A(n)$ will be maintained at approximately the same level, and will only change slowly if the changed result of the test persists.

In order to avoid noise pumping effects introduced by this non-linear processing in situations with near end background noise, in accordance with an exemplary embodiment of the present invention, comfort noise may be added to the compensated signal in accordance with $$e_{NLP}(n) = \frac{32 - A(n)}{32} e_c(n) + \frac{A(n)}{32} CN(n) \tag{6}$$

where $CN(n)$ represents this comfort noise (generated noise having the same level as NL).

Determining threshold $TH(n)$

Threshold $TH(n)$ that is used in the above described non-linear process may be defined as $$TH(n) = \gamma \{\alpha(n) \cdot R_x(n) + \beta(n) \cdot R_{\hat{s}}(n)\} \tag{7}$$

where $\gamma$ is a constant scaling factor, for example in the range 1–10 ($\gamma=4$ in an exemplary embodiment), $\alpha(n)$, $\beta(n)$ are dynamic scale factors (defined below), and $R_x(n)$, $R_{\hat{s}}(n)$ are defined in accordance with $$\begin{cases} R_x(n) = X^T(n)X(n) \\ X(n) = [x(n), x(n-1), \ldots, x(n-M+1)]^T \end{cases} \tag{8}$$

$$R_{\hat{s}}(n) = \rho R_{\hat{s}}(n-1) + (1-\rho)\hat{s}^2(n) \tag{9}$$

Here $X(n)$ is a vector of M (for example 128, 256, 512, i.e. the same as the length of filter 12) samples of input signal $x(n)$, and $\hat{s}(n)$ is the estimated echo.

In equation (7) the first term in the parenthesis, $\alpha(n)R_x(n)$, represents the linear error in the estimation of the echo signal (the difference between the estimated echo and the best possible linear echo estimate of this echo). The second term, $\beta(n)R_{\hat{s}}(n)$, represents non-linear errors introduced by the echo path, which cannot be modelled by a linear model (FIR filter).

An important feature of equation (7) is the scaling by scale factors $\alpha(n)$ and $\beta(n)$. It is to be noted that these scale factors are dynamic (updated every sampling period). The determination of these scale factors will be described in the next two subsections. However, before these scale factors are further described, the non-linear process in accordance with the invention will be described with reference to the flow chart in FIG. 9.

Figure 9:
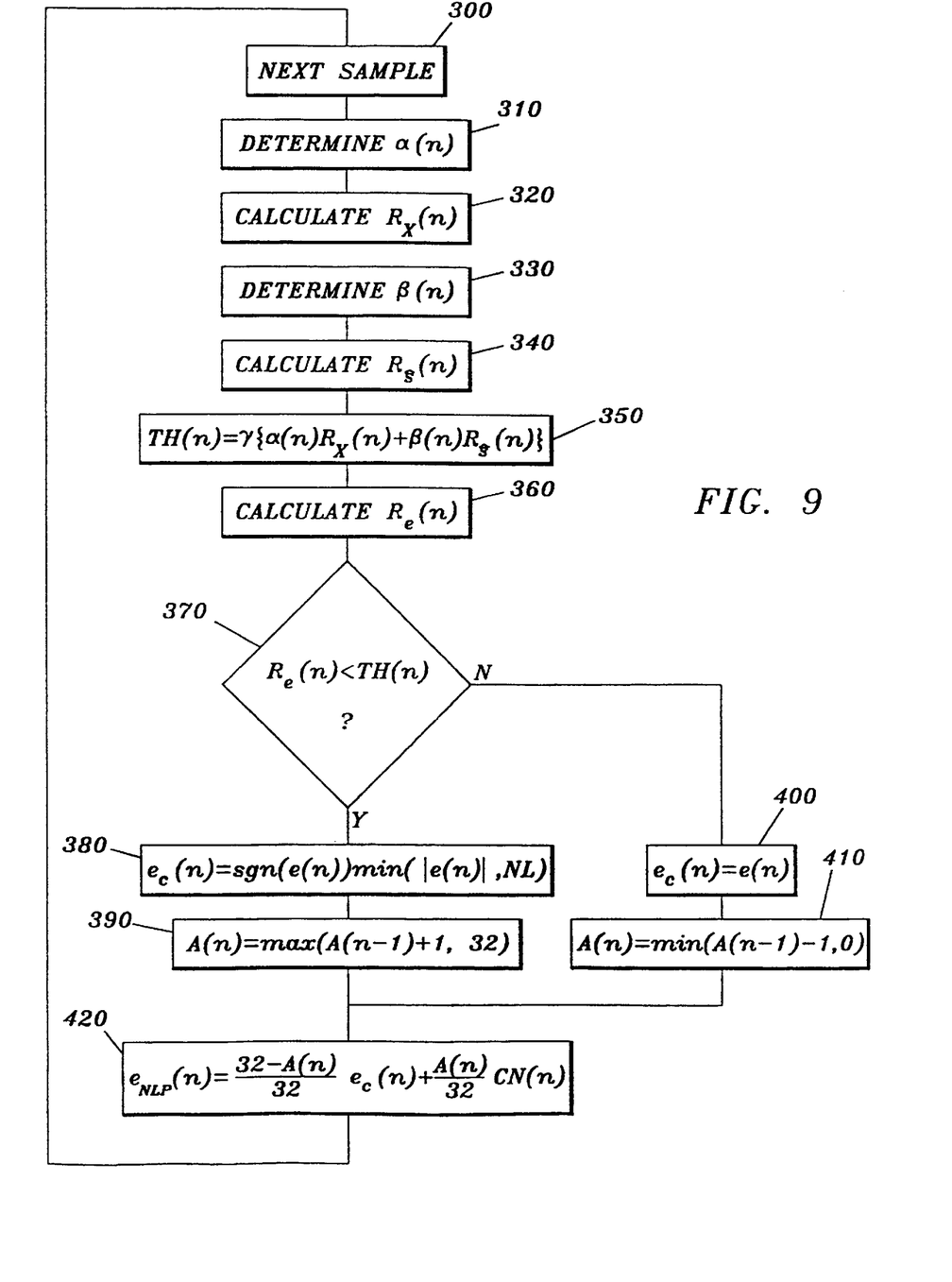
FIG. 9 is a flow chart illustrating the operation of a non-linear processor performing an exemplary embodiment of the method in accordance with the present invention.

In step 300 the sampling period is updated. In step 310 scale factor $\alpha(n)$ is determined (will be described in next subsection). In step 320 power estimate $R_x(n)$ is calculated in accordance with equation (8). In step 330 scale factor $\beta(n)$ is determined (will be described with reference to FIG. 10 below). In step 340 power estimate $R_{\hat{s}}(n)$ is calculated in accordance with equation (9). Step 350 calculates threshold $TH(n)$ for the current sampling period in accordance with equation (7). In step 260 power estimate $R_e(n)$ of residual signal $e(n)$ is calculated in accordance with equation (2). Step 370 tests whether this power estimate falls below the current threshold. If this is the case, compensated signal $e_c(n)$ and attenuation $A(n)$ are calculated (steps 380 and 390, respectively) in accordance with the first parts of equations (3) and (4), respectively. On the other hand, if $R_e(n)$ exceeds threshold $TN(n)$, compensated signal $e_c(n)$ and attenuation $A(n)$ are calculated (steps 400 and 410, respectively) in accordance with the lower parts of equations (3) and (4), respectively. Finally, signal $e_{MLP}(n)$ is calculated (step 420) in accordance with equation (6). Thereafter the flow chart returns to step 300 and repeats the same process for the next sampling period.

Determining scale factor α(n)

It has been found that for a FIR filter that is updated using the NLMS method a suitable algorithm for determining α(n) is described by $$\alpha(n) = \left(1 - \frac{\mu}{N}\right)\alpha(n-1) + \mu^2 \frac{R_e(n-1)}{N \cdot R_x(n-1)} \quad (10)$$

where N is the filter length of the adaptive filter in the echo canceller (for example 512 taps) and $\mu$ is a step length (for example ½, ¼, ⅛). Furthermore, it is assumed that α(0)=1. However, for other estimation methods and/or filter structures α(n)$R_x$(n) should be replaced by an appropriate estimate of the power of the estimation error, see, for example, L. Jung et al., "Theory and Practice of Recursive Identification", The MIT Press, Cambridge, Mass., 1983, pp. 12–16, 88–96 for expressions of these errors.

Determining scale factor β(n)

Scale factor β(n) is determined by the correlation between residual signal e(n) and input signal X(n). In order to determine this correlation a test variable $T_k(n)$ may be formed in accordance with $$T_k(n) = \frac{Ee^2(n)x^2(n-k) - Ee^2(n)Ex^2(n-k)}{Ee^2(n)Ex^2(n-k)} \quad (11)$$

where E represents expected value. Theoretically, this test variable should equal zero if no correlation exists between e(n) and x(n−k), and be larger than zero otherwise. To simplify the procedure $T_k(n)$ may be computed only for those lags k that dominate the echo. Furthermore, since the estimated echo ŝ(n) is a linear combination of delayed input signals x(n), or $$\begin{cases} \hat{s}(n) = h^T(n)X(n) \\ h(n) = [h_0(n), h_1(n), \ldots, h_{N-1}(n)]^T \end{cases} \quad (12)$$

where h(n) represents the filter coefficients of the echo canceller and N represents the length of filter 12, the test variable T may be computer suing ŝ(n) instead of x(n−k), leading to the following expression $$T(n) = \frac{Ee^2(n)\hat{s}^2(n) - Ee^2(n)E\hat{s}^2(n)}{Ee^2(n)E\hat{s}^2(n)} \quad (13)$$

For implementation reasons, it is furthermore advantageous to consider the equivalent expression $$T(n) = E\left\{\left(\frac{e^2(n)}{Ee^2(n)} - 1\right)\left(\frac{\hat{s}^2(n)}{E\hat{s}^2(n)} - 1\right)\right\} \quad (14)$$

Using the factor that $E\hat{s}^2(n) = R_s(n)$ equation (13) may be rewritten as $$T(n) = \left(\frac{e^2(n)}{R_e(n)} - 1\right)\left(\frac{\hat{s}^2(n)}{R_s(n)} - 1\right) \quad (15)$$

This test variable T(n) does not give any explicit value for β(n). instead an average value of this test variable is used for an implicit updating of β(n), which will be described with reference to FIG. 10. If the non-linear processor is inactive, i.e. $R_e(n)$ exceeds the threshold and there is no attenuation, no correlation should be found between e(n) and ŝ(n), which implies that the average of T(n) should equal zero. If this average is not zero, it indicates that β(n) is too small, and should be increased. Similarly, if no correlation is found (average of T(n)=0) when the non-linear processor is active, this indicates that β(n) is too large and should be decreased.

Figure 10:
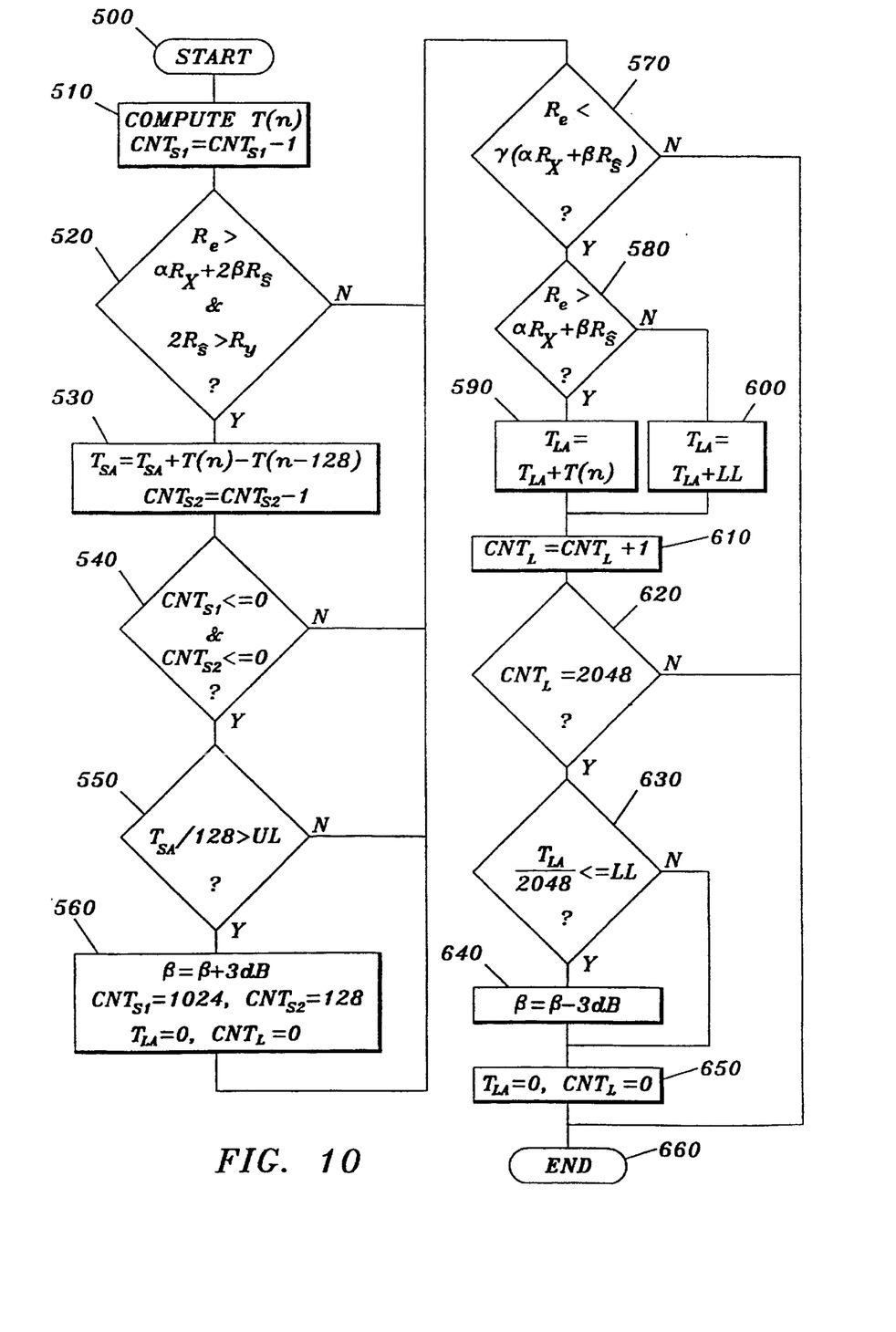
FIG. 10 is a flow chart illustrating a method for determining the dynamic threshold in accordance with an exemplary embodiment of the present invention.

FIG. 10 is a flow chart illustrating the procedure for determining β(n). This procedure is called from step 330 in the flow chart of FIG. 9. The procedure may be summarized as follows.

A short time average $T_{SA}$ of T(n) is computed over a time period of 128 samples. This short time average is used for increasing β(n) (i.e. raising threshold TH(n)). This corresponds to the left part of FIG. 10.

A long time average $T_{LA}$ of T(n) is computed over 2048 samples. This long time average is used for checking that β(n) is not too large (i.e. threshold TH(n) is too high). This part of the procedure is only executed if the non-linear processor is active ($R_e$<TH).

The procedure starts in step 500. In step 510 T(n) is computed in accordance with equation (15). Furthermore, a first counter $CNT_{S1}$ is decremented. This counter runs between 1024 and 0 and prevents β(n) from increasing too rapidly (only one level of 3 dB every 1024 sample).

Step 520 tests whether $R_e > \alpha R_x + 2\beta R_e$. If this condition is fulfilled and there is no obvious double talk situation, i.e. the condition $2R_e > Ry$ is not fulfilled, the procedure performs step 530. In step 530 short time average $T_{SA}$ is updated, and a second counter $CNT_{S2}$ is decremented. Counter $CNT_{S2}$ runs from 128 to 0 and assures that β(n) is increased only when $T_{SA}$ has been completely filled with new samples of T(n).

The next step, step 540, tests whether both counters have been decremented to zero. If this is the case, step 550 tests whether the calculated short time average $T_{SA}$ exceeds a first limit UL (a suitable value for UL is 1.2). If this is the case step 560 increases β by 3 dB and resets counters $CNT_{S1}$, $CNT_{S2}$ to 1024 and 128, respectively. Step 560 then also sets a long time average $T_{LA}$ and a third counter $CNT_L$ to zero and proceeds to step 570. Step 570 is also performed if the tests in steps 520, 540 and 550 fail.

Test 570 tests whether the non-linear processor is active. If so, step 580 tests whether $R_e$ exceeds $\alpha R_y + \beta R_s$. If so, T(n) is added to long time average $T_{LA}$. If not, a constant LL is added to $T_{LA}$. Thereafter the third counter $CNT_L$ is incremented in step 610.

Step 620 tests whether counter $CNT_L$ has reached the value 2048 (2048 samples of T(n) have been added). If so, step 630 tests whether the long time average is less than or equal to the constant LL (a suitable value for LL is 0.4). If this is the case β is decremented by 3 dB in step 640. Otherwise β is left unchanged. Finally $T_{LA}$ and $CNT_L$ are reset to zero to step 650. Thereafter the procedure returns in step 660.

If tests 570, 620 fail, the procedure will not reduce β and will proceed directly to step 660.

In an exemplary embodiment of the invention the non-linear part of the dynamic threshold is represented as β(n)$R_s$(n). However, a similar procedure may be based on other quantities than $R_s$(n), for example quantities $R_y$(n) or $R_x$(n) calculated in analogy with equation (9).

If computational complexity is a concern, it is even possible to base a threshold TH(n) on the simple expression β(n)ŝ(n) (where β(n) is determined in accordance with the principles described with reference to equations (11)–(15)). In such a case this threshold could be compared directly to the amplitude of residual signal e(n).

Figure 11:
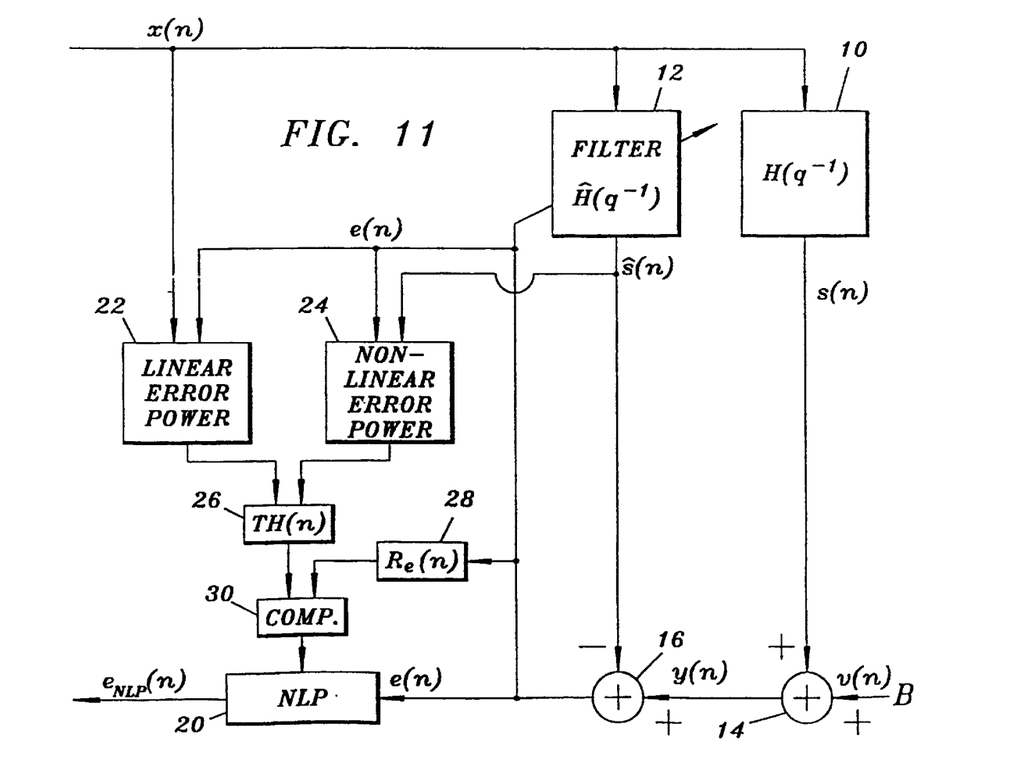
FIG. 11 is a block diagram of an echo canceller operating in accordance with the echo cancellation method of the present invention.

A block diagram of an apparatus that performs the method in accordance with the present invention will now be described with reference to FIG. 11.

A non-linear processor 20 receives residual signal e(n) and outputs the processed signal $e_{MLP}(n)$. Output signal $e_{MLP}(n)$ is computed in accordance with equations (3)–(6). An estimator 22 estimates the power of the linear error in accordance with the first term of equation (7) by using signals x(n) and e(n). Similarly, an estimator 24 computes the second term of equation (7) by using signals e(n) and β(n). Threshold TH(n) is computed in element 26 in accordance with equation (7). An element (28) computes power estimate $R_e(n)$ in accordance with equation (2). A comparator 30 compares $R_e(n)$ to TH(n), and the output signal from comparator 30 determines the shape and attenuation of output signal $E_{MLP}(n)$.

The functions of elements 20–30 may be performed by a microprocessor or a micro/signal processor combination.

It will be understood by those skilled in the art that various modifications and changes may be made to the present invention without departure from the spirit and scope thereof, which is defined by the appended claims.

What is claimed is:

1. An echo cancellation method using a model of an echo path for forming a residual signal, comprising the steps of:
   determining a residual power estimate of said residual signal;
   determining a non-linear error power estimate of said residual signal;
   determining a dynamic threshold that depends on said non-linear error power estimate;
   comparing said residual power estimate to said dynamic threshold; and
   attenuating said residual signal if said residual power estimate falls below said dynamic threshold.

2. The method of claim 1, further comprising:
   determining a linear error power estimate of said residual signal; and
   determining a dynamic threshold that depends on both said linear error power estimate and said non-linear error power estimate.

3. The method of claim 1 wherein the attenuation is increased each time said residual power estimate falls below said dynamic threshold until said residual signal is substantially suppressed.

4. The method of claim 3, wherein said residual signal is attenuated as a non-linear function of the amplitude of said residual signal each time said residual power estimate falls below said dynamic threshold and as a linear function of the amplitude of said residual signal each time said residual power estimate does not fall below said dynamic threshold.

5. The method of claim 4, wherein said non-linear function is a linear function for amplitudes of said residual signal that are below an estimated noise level and a constant function for amplitudes that exceed said noise level.

6. The method of claim 5, wherein said dynamic threshold is formed by the sum of said linear and non-linear error power estimates.

7. The method of claim 6, wherein said dynamic threshold is formed in accordance with the formula $$\gamma\{\alpha(n) \cdot R_x(n) + \beta(n) \cdot R_e(n)\}$$

where
   $R_x(n)$ is a power estimate of an input signal to said echo path,
   $R_e(n)$ is a power estimate of an output signal from said echo path,
   α(n) and β(n) are continuously updated scale factors, and
   γ is a constant scale factor.

8. An echo canceller using a model of an echo path for forming a residual signal, comprising:
   means for determining a residual power estimate of said residual signal;
   means for determining a non-linear error power estimate of said residual signal;
   means for determining a dynamic threshold that depends on said non-linear error power estimate;
   means for comparing said residual power estimate to said dynamic threshold; and
   means for attenuating said residual signal if said residual power estimate falls below said dynamic threshold.

9. The apparatus of claim 8, comprising:
   means for determining a linear error power estimate of said residual signal; and
   means for determining a dynamic threshold that depends on both linear error power estimate and said non-linear error power estimate.

* * * * *